United States Patent
Ahmed et al.

(10) Patent No.: US 9,270,286 B2
(45) Date of Patent: Feb. 23, 2016

(54) PHASE LOCK LOOP WITH CASCADE TRACKING FILTERS FOR SYNCHRONIZING AN ELECTRIC GRID

(71) Applicant: ROCKWELL AUTOMATION TECHNOLOGIES, INC., Mayfield Heights, OH (US)

(72) Inventors: Ahmed Mohamed Sayed Ahmed, Mequon, WI (US); Russel J. Kerkman, Mequon, WI (US); Brian J. Seibel, Grafton, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 14/319,469

(22) Filed: Jun. 30, 2014

(65) Prior Publication Data
US 2015/0381187 A1 Dec. 31, 2015

(51) Int. Cl.
*H03L 7/06* (2006.01)
*H03L 7/08* (2006.01)
*H03L 7/085* (2006.01)

(52) U.S. Cl.
CPC .............. *H03L 7/0802* (2013.01); *H03L 7/085* (2013.01)

(58) Field of Classification Search
USPC .................... 327/147–149, 156–158
See application file for complete search history.

(56) References Cited

U.S. PATENT DOCUMENTS

| 4,078,201 | A   * | 3/1978  | Buser ..................... G01R 25/04 324/209 |
| 8,352,203 | B2    | 1/2013  | Seibel et al. |
| 2009/0268791 | A1 * | 10/2009 | Waheed ................. H03L 7/099 375/219 |
| 2011/0128054 | A1 * | 6/2011  | Kerkman ................. H02J 3/08 327/156 |
| 2011/0199072 | A1 * | 8/2011  | Kerkman ............... G01R 29/18 324/76.77 |
| 2013/0120038 | A1 * | 5/2013  | Kerkman ................. H03L 7/00 327/156 |
| 2013/0120039 | A1 * | 5/2013  | Kerkman ................. H03L 7/00 327/156 |
| 2014/0003102 | A1 * | 1/2014  | Kerkman ............... G01R 25/00 363/47 |

* cited by examiner

*Primary Examiner* — Adam Houston
(74) *Attorney, Agent, or Firm* — Fletcher Yoder, P.C.

(57) ABSTRACT

Present embodiments relate to a method for synchronizing an electric grid. The method includes receiving a phase voltage of the electric grid. The method further includes determining one or more disturbance frequencies in the phase voltage via a plurality of sequential tracking filters, wherein each of the plurality of tracking filters corresponds to a harmonic of the received phase voltage. The method further includes removing the disturbance frequencies components sequentially to produce a minimally distorted frequency, and performing a PLL operation on the clean frequency to determine a phase angle of the frequency.

20 Claims, 6 Drawing Sheets

PHASE LOCK LOOP WITH CASCADE TRACKING FILTERS FOR SYNCHRONIZING AN ELECTRIC GRID

BACKGROUND

The invention relates generally to electrical networks, and more specifically, to methods of synchronizing input signals into the electrical networks.

Electrical devices may be connected or organized in a network to enable the transmission of power to the devices, or communication between the devices. Such a network of interconnected devices may be described as a grid. For example, an electric grid may be an interconnected network for delivering electricity from one or more power generators to the connected devices (e.g., customers of the utility company). A power grid may transmit AC power at a synchronized frequency, amplitude, and/or phase angle to efficiently connect a large number of power generators and devices. Synchronized operation of a grid, or portions of a grid, may enable a pooling of power generation, as well as a pooling of loads to result in lower operating costs.

The synchronized transmission of AC power may be beneficial for efficiently transmitting and/or distributing of power. However, many factors may disturb the synchronization of a grid. For example, voltage imbalances, angular frequency variations, and voltage harmonic distortions may significantly disturb grid synchronization. In some situations, voltage imbalances may be common in a power grid, as single phase loads of a grid may not be evenly distributed between the phases of the supplied power and may be continuously connected and disconnected. Furthermore, the presence of grid voltage imbalances may generate or propagate voltage harmonic distortions that may have further undesired effects on the synchronization of the grid.

Such discrepancies in the amplitudes, frequencies, and/or phase angles between two parallel voltages may cause abnormal current circulation within the grid, which may result in a large current imbalance. In some power grids, even a small voltage imbalance may result in a large current imbalance. In addition, in some situations, voltage harmonic distortions may disrupt the synchronization of the grid. Imbalanced currents may stress grid devices, such as AC-DC converters, cycloconverters, active filters, induction motors, and other energy storage systems which function to convert and/or transfer power through the grid to the connected electric devices. Imbalanced current may also stress grid link inductors. Accordingly, methods of decreasing the effects of voltage imbalances and/or voltage harmonic distortions may improve the performance and synchronous operation of a grid.

BRIEF DESCRIPTION

Certain embodiments commensurate in scope with the originally claimed invention are summarized below. These embodiments are intended only to provide a brief summary of possible forms of the invention. Indeed, the invention may encompass a variety of forms that may be similar to or different from the embodiments set forth below.

One embodiment relates to a method for synchronizing an electric grid. The method includes receiving a phase voltage of the electric grid. The method further includes determining one or more disturbance frequencies in the phase voltage via a plurality of sequential tracking filters, wherein each of the plurality of tracking filters corresponds to a harmonic of the received phase voltage. The method further includes removing the disturbance frequencies sequentially to produce a clean frequency, and performing a PLL operation on the clean frequency to determine a phase angle of the frequency.

Another embodiment relates to a grid system. The grid system includes an electric grid comprising circuitry configured to receive a phase voltage. The grid system also includes one or more sequential tracking filters configured to determine a frequency of one or more disturbances in the phase voltage. Each tracking filter corresponds to a harmonic of the received phase voltage. The grid system also includes a phase-locked loop (PLL) configured to remove each determined disturbance frequency sequentially via the one or more sequential tracking filters to generate a minimally distorted frequency. The PLL is configured to determine a phase angle of the grid based on the clean frequency.

Another embodiment relates to a phase-locked loop (PLL). The PLL includes circuitry configured to receive a phase voltage of an electric grid, determine an estimated phase angle based on a clean phase voltage of the electric grid, and output a voltage based on the estimated phase angle. The PLL also includes one or more sequential tracking filters configured to determine one or more harmonic disturbance frequencies in the phase voltage. Each sequential tracking filter is configured to sequentially remove the determined harmonic disturbance frequency from the phase voltage to produce the phase voltage.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

A grid may refer to a network of loads (e.g., motors, end devices, etc.) which may be interconnected to enable communication between the loads and/or the transmission of power to the loads. One example of a grid is a power grid, which may include a network of power generators, distributers, and customers. One or more power plants typically generate power, which is converted and distributed to customers of the utility company, most typically as three-phase power.

On a smaller scale, an industrial grid may be another example of a grid, where power generators may generate power to be distributed to various motors or other devices powered via the grid.

An electric grid (e.g., a power grid, an industrial grid, etc.) will typically operate using alternating current (AC) power sources operating in parallel. Power generated and distributed by various sources (e.g., power plant, a generator, etc.) will also be synchronized in frequency, amplitude, and/or phase angle. Synchronization of AC power results in the efficient transmission and/or distribution of power. However, disturbances such as voltage imbalance, angular frequency variations, and/or voltage harmonic distortion may disrupt the synchronization of AC power transmission. In particular, voltage imbalances may be common in a power grid, as single phase loads of a grid may not be evenly distributed between the phases of the supplied power, and may be continuously connected and disconnected. Furthermore, the configuration of a typical power system may be inherently asymmetrical.

Figure 1:
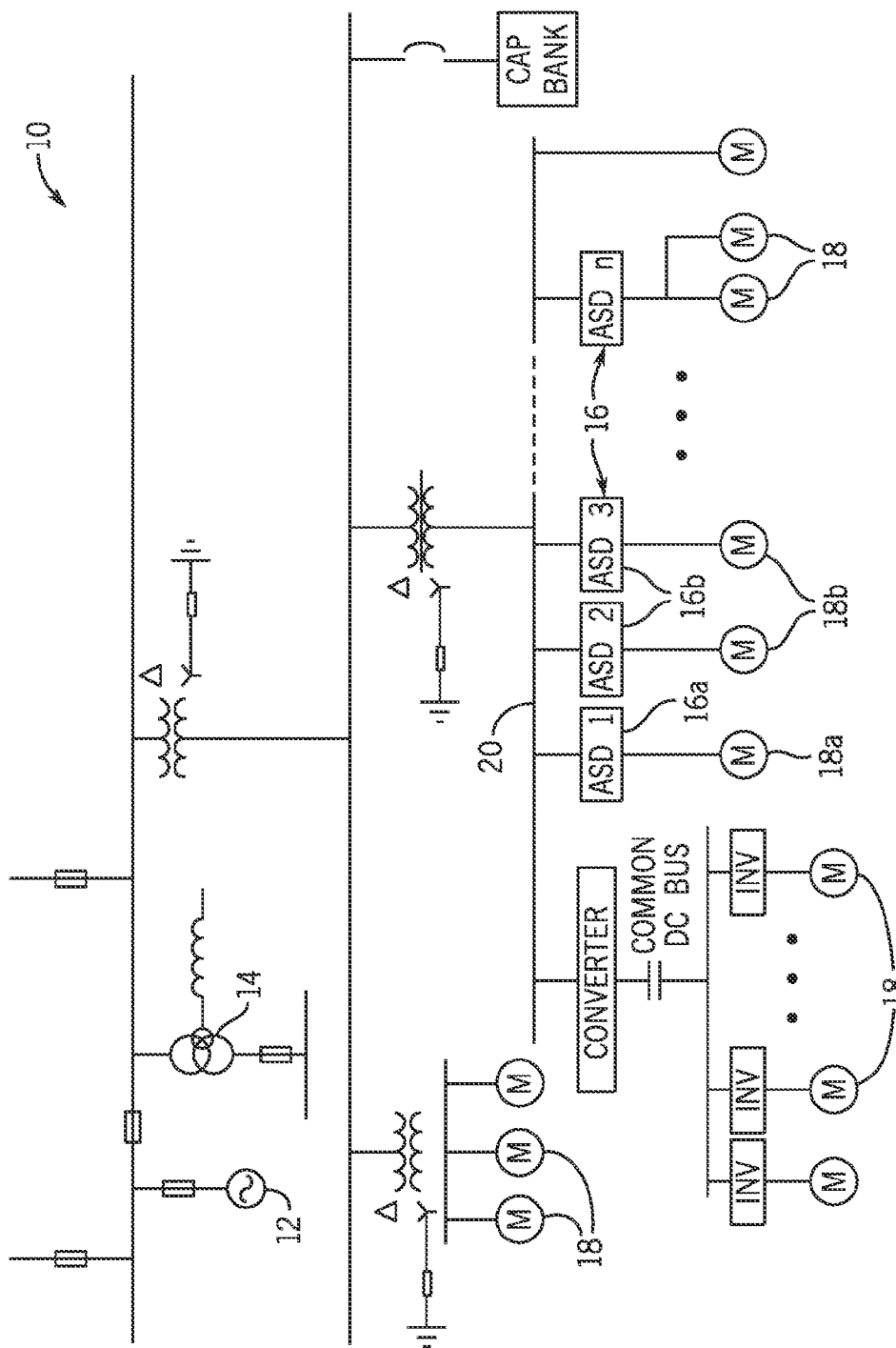
FIG. 1 is a block diagram illustrating a power grid system, in accordance with one embodiment of the present techniques.

With the forgoing in mind, FIG. 1 is a block diagram of an embodiment of an electric grid 10, illustrating a generator 12 configured to deliver power through the electric grid 10 to one or more motors 18. As noted above, the one or more motors 18 may be various devices and loads, such as, for example, one or more electric devices configured to receive the power from the grid (or other source). Typically, the electric grid 10 will operate as a three-phase AC power source, and may include a three-phase transformer 14, which may control the values of the three-phase voltage used in a typical power-delivering grid. Further, as the motor 18 for each electric device may operate at a different speed, the grid 10 may also include adjustable speed drives (ASDs) 16 configured to adjust the operating speed of the motors 18 for each device. Such drives may also be referred to as motor drives, motor controllers, and the like. Similarly motors may be driven by motor starters, soft starters, across-the-line starters, and so forth. As noted, however, the motors and ASDs discussed here should be understood to constituted exemplary loads, while many other loads may be accommodated.

In certain embodiments, the electric grid 10 may not be symmetrical, as the loads (e.g., the electrical devices connected to the motors 18) may not be evenly distributed between phases. For example, the connection or disconnection of any motor 18 within the grid 10 may affect the three-phase signals distributed by the generator 12 and the three-phase transformer 14. Furthermore, in some embodiments, a voltage imbalance (i.e., discrepancies in the amplitudes, frequencies, and/or phase angles) at one motor 18 may affect the synchronization of the other motors 18 coupled to the unbalanced motor 18. For example, at a point of common coupling 20, a voltage imbalance at a first motor 18a coupled to ASD1 16a may result in a voltage imbalance at a second motor 18b coupled to ASD2 16b or ASD3 16b, since there is no impedance between the motors 18 to prevent the voltage imbalance from propagating through commonly coupled motors 18 of the grid 10. As further discussed below, such imbalance (i.e., discrepancies in the amplitudes, frequencies, and/or phase angles) between the two voltages coupled at the point of common coupling 20 may cause a large current imbalance within the grid 10, which may cause undesired effects through the grid 10 and the motors 18 of the electrical devices. In certain embodiments, the presence of grid 10 voltage imbalances may generate or propagate voltage harmonic distortions that may have further undesired effects on the grid 10. Accordingly, it may be beneficial to decrease the effects of voltage imbalances and/or voltage harmonic distortions to improve the performance and synchronous operation of the grid 10.

Figure 2:
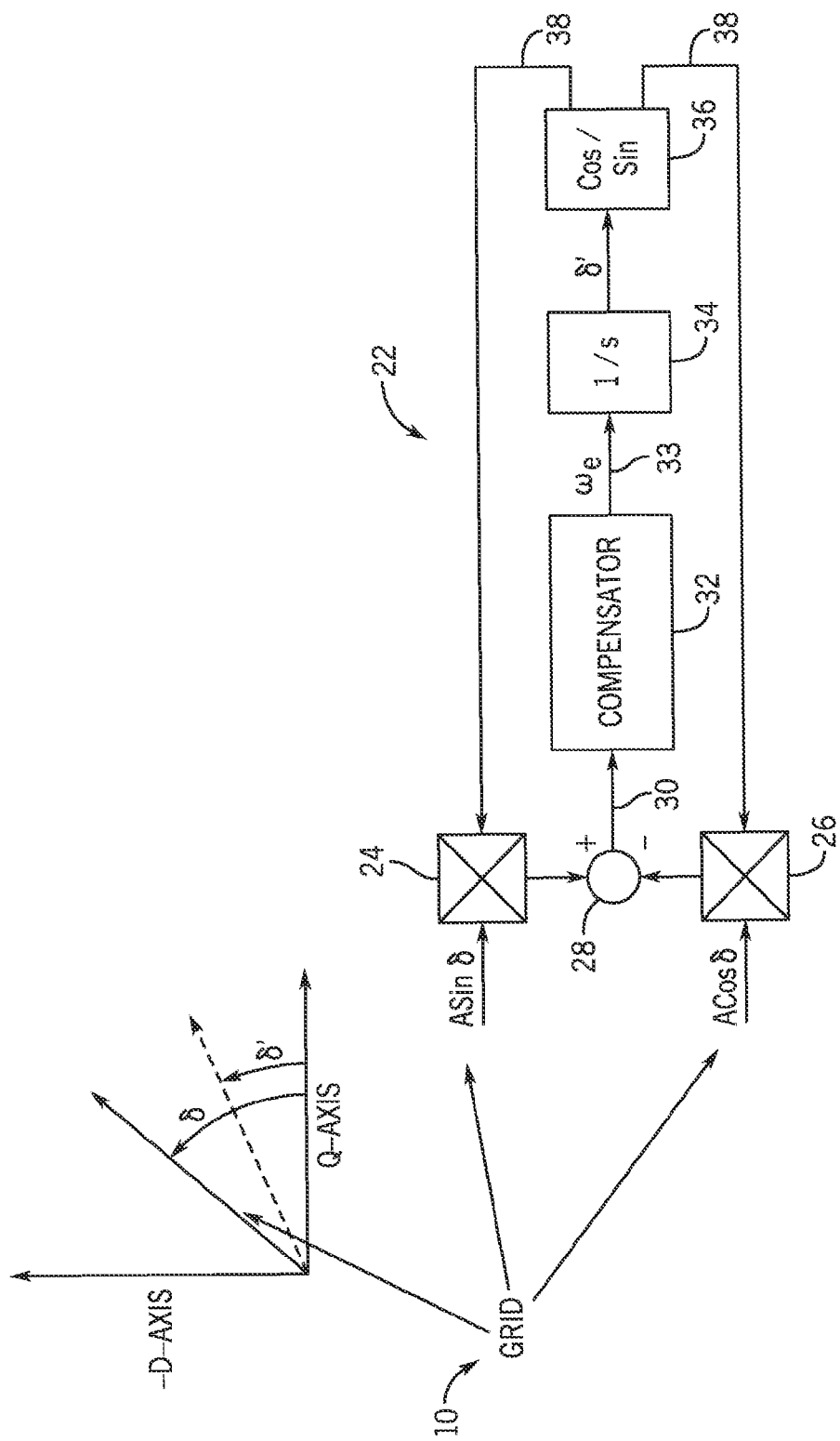
FIG. 2 is a block diagram illustrating a phase-locked-loop, where the phase-locked loop is configured to output an estimate phase angle of a electric grid voltage for the grid of FIG. 1.

FIG. 2 is a block diagram illustrating a phase-locked loop 22 (PLL) configured to control phase synchronization of the electrical grid 10 of FIG. 1. The grid 10 will typically supply voltage in three phases balanced 120° from each other. In the illustrated embodiment, these three phases may be depicted as a two-phase equivalent. Specifically, the two-phase voltage inputs may be sinusoidal waveforms which are 90° out of phase, rotating in steady state, and at the frequency of the grid voltage. The instantaneous angular position δ of the equivalent vector to the phase voltages 10 may be regulated to the PLL 22 (e.g., feedback loop) which ideally regulates the voltage in the d-axis ($V_d$ 30), or the sum of the inputs via adder 28, to the value of the reference signal frequency (e.g., zero in this case). Accordingly, in some embodiments, the PLL technique 22 may be utilized for regulating to zero the difference between the PLL output 6' (e.g., phase angle estimate δ') and the phase δ of the two measured inputs A sin δ and A cos δ.

Alternatively, in some embodiments, the PLL 22 (e.g., the feedback loop) may regulate the voltage in the q-axis to a reference value of one if a per-unit value is considered. Using the d-axis regulation as an example, the detected d-component of the voltage vector $V_d$ 30 may also be referred to as an error signal. The $V_d$ 30 may be transmitted to a compensator 32 which determines a frequency estimate $\omega'_e$ of the grid voltage. The frequency estimate $\omega'_e$ may then be integrated by an integrator 34 to determine a phase angle estimate δ' of the grid voltage. The phase angle estimate δ' may be used by another transformation 36 to output a sinusoid and a cosinusoid 38, which may be fed back and multiplied with the original inputs A sin δ and A cos δ to generate, when subtracted, a new error signal $V_d$ 30 which may be regulated through the PLL 22.

In some situations, such as if harmonic distortions and/or voltage imbalances are not present, a high bandwidth PLL 22 may detect the phase angle and amplitude of the voltage vector to maintain grid 10 synchronization. In certain embodiments, when harmonic distortions are present (e.g., the voltage is distorted with high-order harmonics), the bandwidth of the PLL 22 may be reduced to reject and eliminate the effect of the harmonics on the output. However, in some situations, bandwidth reduction of the PLL 22 may result in degraded transient performance. Thus, as previously discussed, the harmonic distortions and/or voltage imbalances may continue to cause abnormal current conditions which could result in sub-optimal performance of the power source and/or devices connected to the power grid. Accordingly, it may be beneficial to provide for a PLL configured to reject the effects of voltage imbalances and/or voltage harmonics to improve the performance and synchronous operation of the grid 10, as described in detail with respect to FIG. 3.

Figure 3:
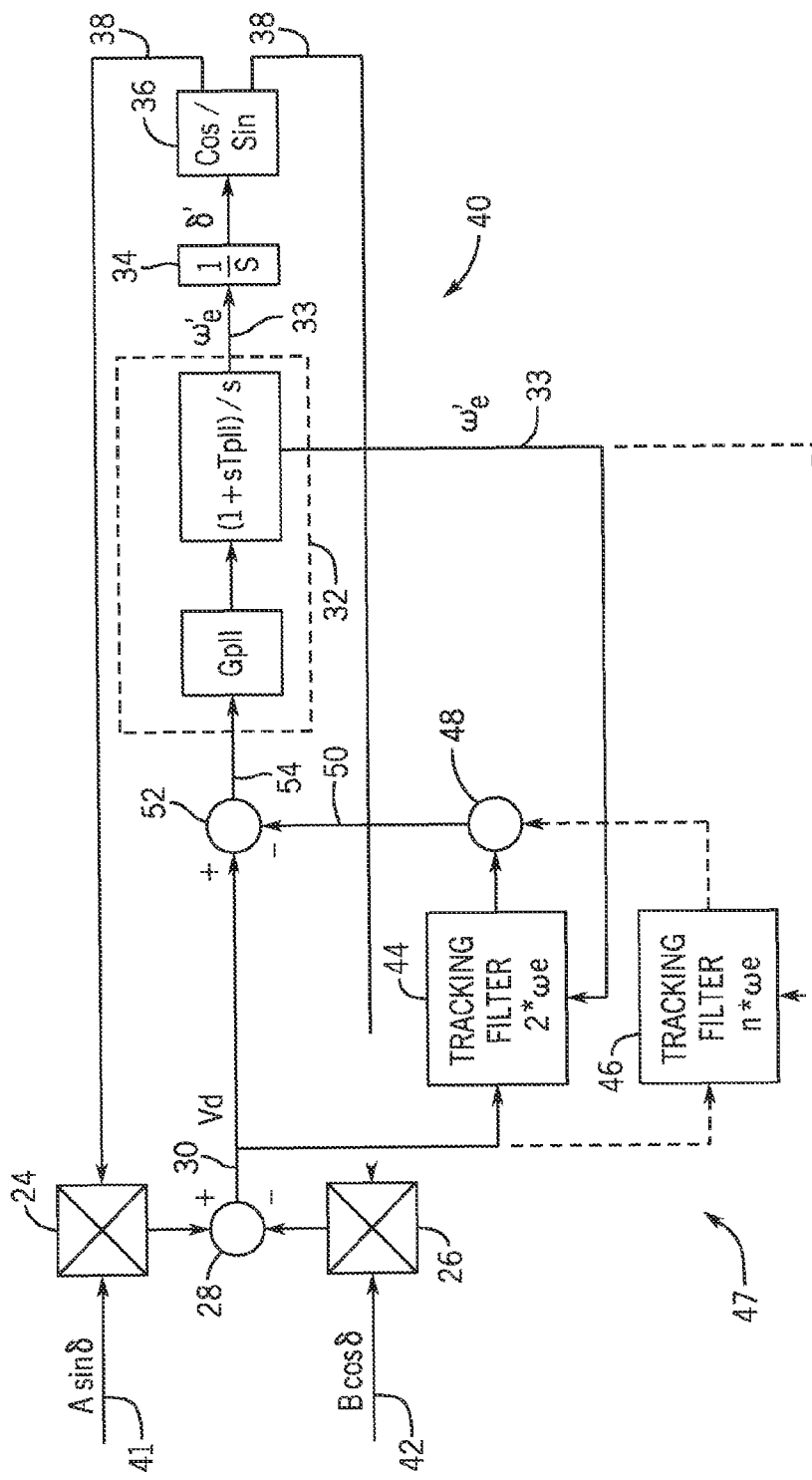
FIG. 3 is a block diagram illustrating the phase-locked-loop of FIG. 2 having one or more parallel tracking filters, where the phase-locked loop and the parallel tracking filters are configured to output a synchronized voltage when the voltage inputs are unbalanced.

FIG. 3 is a block diagram illustrating an embodiment of the PLL 22 of FIG. 2 configured to determine the phase angle estimate δ' of the grid 10 voltage, to compensate for the phase imbalance within the grid 10, and to control phase synchronization of the grid 10. For example, in the illustrated embodiment, a phase-locked loop 40 (PLL) may receive inputs (e.g., A sin δ 41 and B cos δ 42) imbalanced in phase and/or amplitude, as illustrated with the different voltage vectors having different voltage amplitudes A and B. The two inputs A sin δ 41 and B cos δ 42 may be transformed by the multipliers 24 and 28 to obtain $V_d$ 30, which may be representative of an estimate of the imbalance in the voltage vectors of the grid 10.

In certain embodiments, the PLL 40 configured for imbalanced voltage inputs (e.g., A sin δ 41 and B cos δ 42) may transmit $V_d$ 30 to one or more parallel tracking filters 44 and 46. When the grid 10 is balanced, the $V_d$ 30 may be direct current (DC). In some situations, when the grid 10 is imbalanced, the $V_d$ 30 may be a non-DC signal with a complex frequency spectrum, having a dominant second harmonic of the grid 10. Accordingly, the tracking filter 44 may be configured to determine a disturbance 50 in $V_d$ 30, which may represent twice the fundamental frequency of the error signal $V_d$ 30 (e.g., the voltage imbalance in the input signals A sin δ 41 and B cos δ 42). In certain embodiments, the compensator 32 may output a frequency estimate ω'e 33 of the grid voltage to the integrator 34. Further, the frequency estimate ω'e 33 output from the compensator 32 may additionally be utilized as inputs to the one or more parallel tracking filters 44 and 46. For example, determining the disturbance 50 may be based on inputs into the parallel tracking filters 44 and 46 from the compensator 32, which outputs a frequency estimate ω'e 33 of the grid voltage. In certain embodiments, such as if the grid 10 is imbalanced with a dominant second harmonic, the output of the tracking filter 44 may be an estimate of twice the fundamental frequency of $V_d$ 30 (e.g., $2*\omega_e$).

In some embodiments, the tracking filter 44 may include hardware, software, or a combination of both, which tracks a frequency of a sinusoidal reference (e.g., the $V_d$ 30) based on a current and a time-delayed sample of the frequency estimate ω'e 33 (input from the compensator 32), and based on the relationship below:

$$\begin{bmatrix} x_1(KT) \\ x_2(KT) \end{bmatrix} = A \begin{bmatrix} x_1(K-1)T \\ x_2(K-1)T \end{bmatrix} + B[u(KT) + u(K-1)T] \quad \text{eq. (1)}$$

where K represents the current sample, T represents the sampling time, $x_1(KT)$ represents the current estimate of the frequency of the error signal $V_d$ 30, and $x_1(K-1)T$ represents a previous estimate of the frequency of the error signal $V_d$ 30. The relationship $u(KT)+u(K-1)T$ may be obtained by adding a time delayed sample of the synchronized frequency estimate $\omega_e$ input from the compensator 32. Matrix A may be a 2×2 matrix, and matrix B may be a 2×1 matrix, both defined below:

$$A = \frac{1}{1 + \frac{T}{2}a + \left(\frac{T}{2}\omega_0(KT)\right)^2} \begin{bmatrix} 1 & -\frac{T}{2}\omega_0(KT) \\ \frac{T}{2}\omega_0(KT) & 1 + \frac{T}{2}a \end{bmatrix} \quad \text{eq. (3)}$$

$$\begin{bmatrix} 1 - \frac{T}{2}a & -\frac{T}{2}\omega_0(K-1)T \\ \frac{T}{2}\omega_0(K-1)T & 1 \end{bmatrix}$$

$$B = \frac{1}{1 + \frac{2}{aT} + \frac{T}{2a}(\omega_0(KT))^2} \begin{bmatrix} 1 \\ \frac{T}{2}\omega_0(KT) \end{bmatrix} \quad \text{eq. (4)}$$

In some embodiments, the phase lock loop 40 may include one or more tracking filters (e.g., tracking filters 44, 46) arranged in a parallel configuration 47, and configured to track other frequency components contributing to a voltage imbalance within the $V_d$ 30 (e.g., high order harmonics). For example, in the illustrated embodiment, the tracking filter 46 may be tunable (e.g., $n*\omega_e$) and may be set to a value which estimates other harmonic disturbances, or the alternate current (AC) component of the signal $V_d$ 30. For example, the PLL 40 may include a tracking filter set to the second harmonic disturbance (voltage imbalance), a tracking filter set to the sixth harmonic disturbance (fifth and seventh stationary frame harmonics), etc. Particularly, the outputs of the parallel tracking filters 44 and 46, which may include the frequency estimate of the error signal $V_d$ 30, and/or any other disturbance contributing to voltage imbalance and distortion (e.g., the third harmonic, the fifth harmonic, the DC offset, etc.), may be added in the adder 48 (e.g., summation block) to generate the disturbance 50. Further, the outputs of any number of parallel tracking filters having the frequency estimates of the error signal $V_d$ 30 may be added in the adder 48 to generate and track the disturbance 50. In the illustrated embodiment, the output of each of the one or more parallel tracking filters may be added at the adder 48 (e.g., to generate the disturbance 50), before the generated and tracked disturbance 50 is provided back into the PLL 40. As the PLL 40 may have one or more parallel tracking filters (e.g., the tracking filter 40 and/or 46), the second tracking filter 46 and the adder 48 are represented by dotted lines. In addition, it should be noted that the input for each additional parallel tracking filter added may be provided by the compensator 32, and the output for each additional parallel tracking filter added may be provided to the adder 48.

The tracked disturbance 50 may be subtracted from the signal $V_d$ 30 at the adder-subtractor 52, such that a "minimally distorted" voltage signal 54 may be transmitted to the compensator 32. Thus, the clean signal 54 may be the signal $V_d$ 30 with the tracked disturbances 50 removed (e.g., subtracted at the adder-subtractor 52). The integrator 34 may include a system of amplifiers and integrators which may determine a phase angle δ' based on the frequency estimate ω'e 33 of the grid voltage. For example, the compensator 32 may output the phase angle estimate δ', which may be an estimate of the phase angle δ of the grid 10. Further, as discussed, the compensator 32 may also output the frequency estimate ω'e 33 to the tracking filters 44 and 46, such that the tracking filters may apply one or more algorithms to estimate the disturbance 50 based on current and time delayed estimated frequency ω'e 33 of the grid phase voltages. The estimated phase angle δ' output by the compensator 32 may be transformed by 36 before it is output back to the multipliers 24 and 26 in the PLL 40.

Figure 3A:
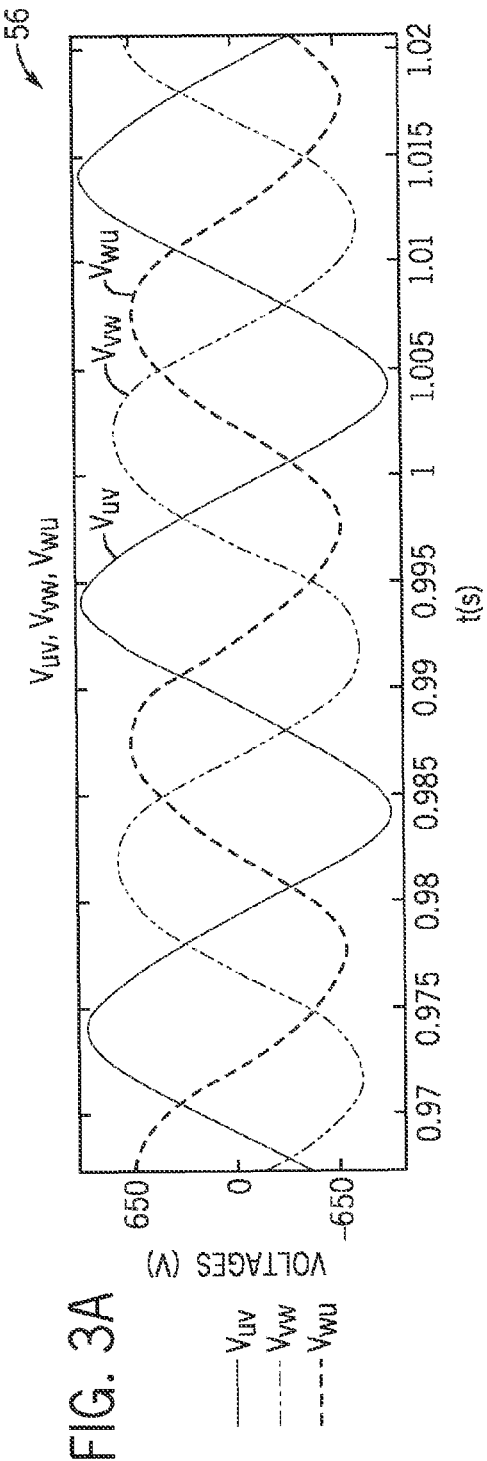
FIGS. 3A and 3B are graphs illustrating current imbalance in an electric grid current having three phases.
Figure 3B:
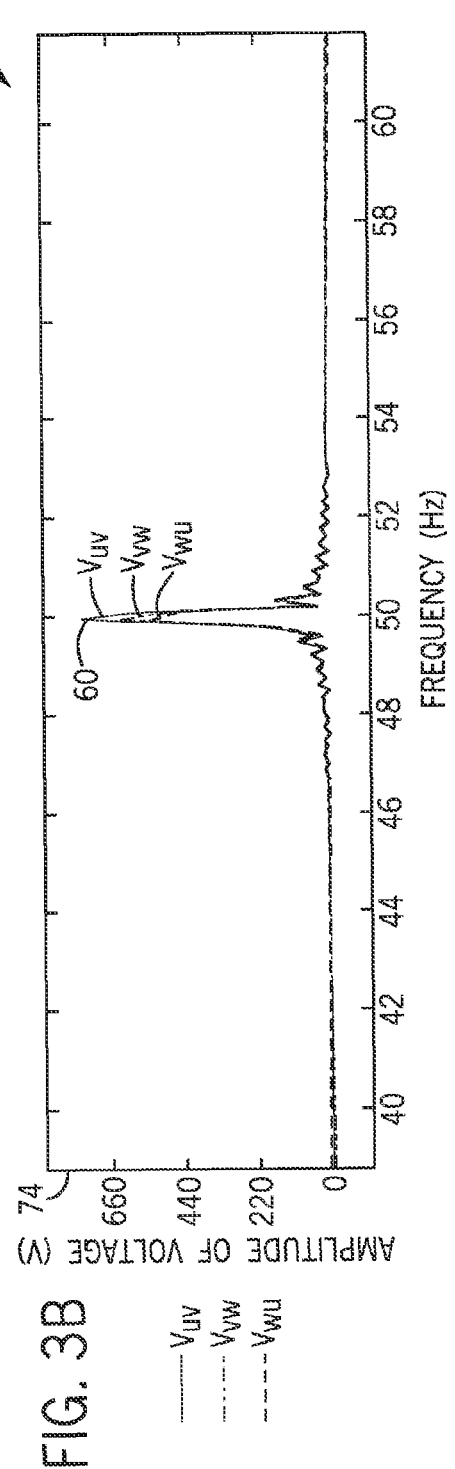

FIGS. 3A and 3B illustrate embodiments of the effects of the PLL 40 of FIG. 3. For example, FIG. 3A illustrates a graph 56 depicting unbalance in the input line voltages (e.g., A sin δ 41 and B cos δ 42). The graph 56 depicts three phases of the voltage vectors (e.g., $V_{uv}$, $V_{vw}$, $V_{wu}$) in the time domain (e.g., t(s)). Likewise, FIG. 3B illustrates a graph 58 depicting a magnitude 60 of the three phases of the voltage vectors (e.g., $V_{uv}$, $V_{vw}$, $V_{wu}$) illustrated in FIG. 3A. The frequency response of the imbalance in the input line voltages is represented as a spike 60 in the current amplitude of currents $V_{uv}$, $V_{vw}$, and $V_{wu}$ at 50 Hz. As illustrated in FIGS. 3A and 3B, the phases and the amplitudes of the voltage vectors (e.g., $V_{uv}$, $V_{vw}$, $V_{wu}$) are imbalanced, thereby the grid 10 may not operate synchronously.

Accordingly, as noted above with respect to FIG. 3, implementing the one or more parallel tracking filters 44, 46 with the PLL 22 of FIG. 2 (e.g., the PLL 40) may provide a PLL 40 output (e.g., the angular frequency estimate ω'e 33) that may be synchronized with the frequency of the grid voltage (e.g., reference angular frequency $\omega_{ref}$). For example, in some situations, the output of the PLL 20 (as noted above with respect to FIG. 2) may result in a fluctuation at twice the fundamental frequency of 50 Hz of the second harmonic disturbance. However, the PLL 40, utilizing the one or more parallel tracking filters 44 and 46, may track and remove the frequency of the disturbance 50. Further, the PLL 40 may result in an output where the frequencies of the second harmonic disturbance are removed, as noted above with respect to FIG. 3. However, in some situations, the dynamics of the PLL 40 parallel tracking filters 44 and 46 may be better suited to one or more tracking filters arranged in a cascade configuration, as further described with respect to FIG. 4.

Figure 4:
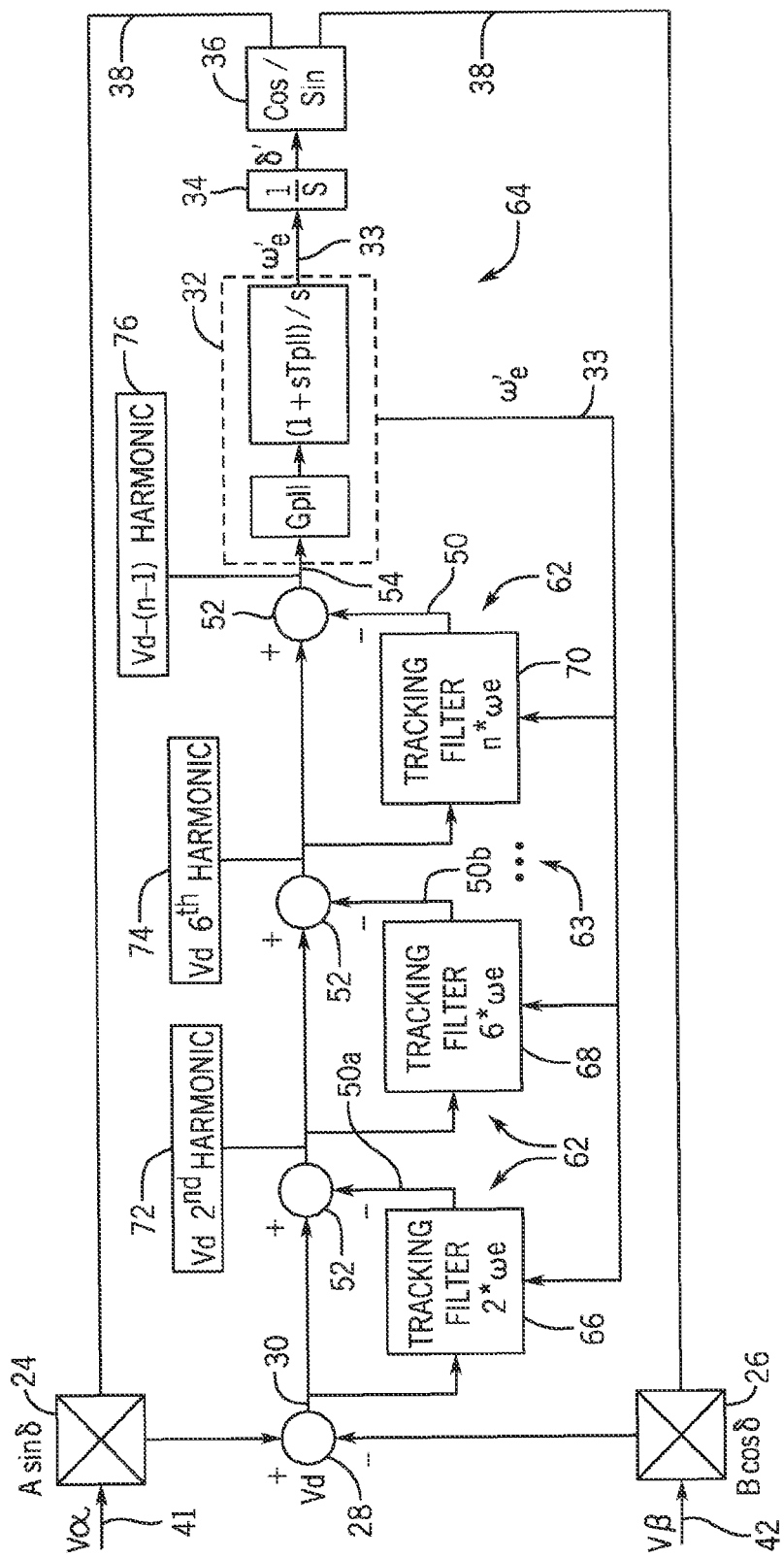
FIG. 4 is a block diagram illustrating a phase-locked-loop of FIG. 2 having one or more cascade tracking filters, where the phase-locked loop and the cascade tracking filters are configured to output a synchronized voltage in the presence of voltage harmonic distortions.

FIG. 4 is a block diagram illustrating an embodiment of the PLL 22 of FIG. 2 having one or more cascade tracking filters 62 arranged in a serial configuration 63. In the illustrated embodiment, the phase-locked loop 64 (e.g., PLL 64) may include one or more cascade tracking filters 62 (e.g., a first tracking filter 66, a second tracking filter 68, and a third tracking filter 70, or more) configured to output a synchronized voltage in the presence of voltage harmonic distortions. For example, the cascade tracking filters 62 are arranged in the serial configuration 63, such that each cascade tracking filter 62 may be configured to output an frequency estimate of the error signal $V_d$ 30 that may be used to generate and/or track one or more disturbances 50 (e.g., $2^{nd}$, $3^{rd}$, $4^{th}$, $5^{th}$, $6^{th}$, $7^{th}$, or $n^{th}$ harmonic disturbances). In some embodiments, the output of each cascade tracking filter 62 (e.g., the tracked disturbance 50) may be subtracted from the signal $V_d$ 30 at one or more serially arranged adder-subtractors 52 to generate the "clean" voltage signal 54, which may then be transmitted to the compensator 32 of the PLL 64, as further described in detail below. In this manner, the cascade filters 62 may be configured to operate in a continuously operating (e.g., continuously active) PLL 64 system. Further, while the parallel tracking filters 44, 46 (as illustrated in FIG. 3) may interact with each other, the illustrated embodiment depicts cascade tracking filters 62 that may function independent of one another with absolutely no interaction between each other to track various orders of harmonic disturbances 50, as further described in detail below.

As noted above, in certain embodiments, the PLL 64 may be configured to received imbalanced inputs, such as inputs (e.g., A sin δ 41 and B cos δ 42) imbalanced in phase and/or amplitude, (e.g., different voltage amplitudes A and B). The two inputs A sin δ 41 and B cos δ 42 may be transformed by the multipliers 24 and 28 to obtain $V_d$ 30, which may be representative of an estimate of the imbalance in the voltage vectors of the grid 10. In certain embodiments, the PLL 64 may be configured to operate continuously, such that inputs are received at all times. In some situations, the inputs provided may be balanced (e.g., A sin δ and A cos δ), as illustrated in FIG. 2, and the $V_d$ 30 may be direct current (DC). In other situations, the inputs and the grid 10 may be imbalanced (e.g., A sin δ and B cos δ), and the $V_d$ 30 may be a non-DC signal with a complex frequency spectrum, having one or more harmonic disturbances of various orders.

Accordingly, in some embodiments, the PLL 64 may include one or more cascade tracking filters 62 that may be configured to determine the disturbances 50 in Vd 30, where each disturbance 50 may be a high order harmonic (e.g., $1^{st}$, $2^{nd}$, $3^{rd}$, $4^{th}$, $5^{th}$, $6^{th}$, $7^{th}$, or $n^{th}$ harmonic disturbances) and/or voltage measurement offset, imbalance and distortion. For example, in the illustrated embodiment, the first tracking filter 66 may be tuned to $2^*\omega_e$, and may be configured to determine the disturbance 50, which may represent twice the fundamental frequency of the error signal $V_d$ 30. As a further example, the second tracking filter 68 may be tuned to $6^*\omega_e$, and the disturbance 50 determined may be representative of a fifth order harmonic disturbance and/or a seventh order harmonic disturbance in the stationary frame of reference. In addition, it should be noted that any number of cascade tracking filter 62 may be utilized, such as for example, the third tracking filter 70 which may be tunable (e.g., $n^*\omega_e$) and may be set to a value which estimates other harmonic disturbances, or the alternate current (AC) component of the signal $V_d$ 30.

In certain embodiments, the compensator 32 may output a frequency estimate w'e 33 of the grid voltage to the integrator 34 and/or to the one or more cascade tracking filters 62 as inputs. As noted above with respect to FIG. 3, in some embodiments, the cascade tracking filters 62 may include hardware, software, or a combination of both, which tracks a frequency of a sinusoidal reference (e.g., the $V_d$ 30) based on a current and a time-delayed sample of the frequency estimate ω'e 33 33 (input from the compensator 32). Particularly, the output of each cascade tracking filters 62, which may include the frequency estimate of the error signal $V_d$ 30, and/or any other disturbance contributing to voltage imbalance and distortion (e.g., the third harmonic, the fifth harmonic, the seventh harmonic, DC offsets, the eleventh component, etc.), may be used to generate the disturbances 50. Further, the generated and/or tracked disturbance 50 representative of each harmonic disturbance determined by each cascade tracking filter 62 may be subtracted from the signal $V_d$ 30 via one or more adder/subtractors 52. For example, the first tracking filter 66 may be configured to determine a disturbance 50a representative of twice the fundamental frequency of the error signal $V_d$ 30 (e.g., second harmonic component in the synchronous reference frame, or third harmonic component in the stationary reference frame/in the ac line voltage). Accordingly, the adder/subtractor 52 may be configured to remove the second harmonic component (e.g., the disturbance 50a) from the signal $V_d$ 30 to generate the signal $V_d$ 72. The signal $V_d$ 72 may be provided as an input to the second tracking filter 68. Likewise, the second tracking filter 68 may be configured to determine a disturbance 50b representative of six times the fundamental frequency of the error signal $V_d$ 30 (e.g., sixth harmonic in the synchronous reference frame, or fifth and seventh harmonic component in the stationary reference frame/in the ac line voltage). The adder/subtractor 52 may be configured to remove the sixth harmonic component from the signal $V_d$ 72 to generate the signal $V_d$ 74. The signal $V_d$ 74 may be provided as an input to the next cascade tracking filter 62 within the series and/or to the compensator 32 of the PLL 64. For example, if the signal $V_d$ 74 is provided to another cascade tracking filter 62, another harmonic disturbance of the signal $V_d$ 30 may be removed (e.g., the signal $V_d$ 76) to produce the clean voltage signal 54.

Accordingly, the one or more tracked disturbances 50 may be subtracted from the signal $V_d$ 30 at the adder-subtractors 52, such that a "clean" voltage signal 54 may be transmitted to the compensator 32. Further, as noted above with respect to FIG. 3, the compensator 32 may include a system of amplifiers and integrators which may determine a phase angle δ' based on the frequency estimate ω'e 33 33 of the grid voltage. For example, the integrator 34 may output the phase angle estimate δ', which may be an estimate of the phase angle δ of the grid 10. The estimated phase angle δ' output by the compensator 32 may be transformed by 36 before it is output back to the multipliers 24 and 26 in the PLL 64.

Figure 5:
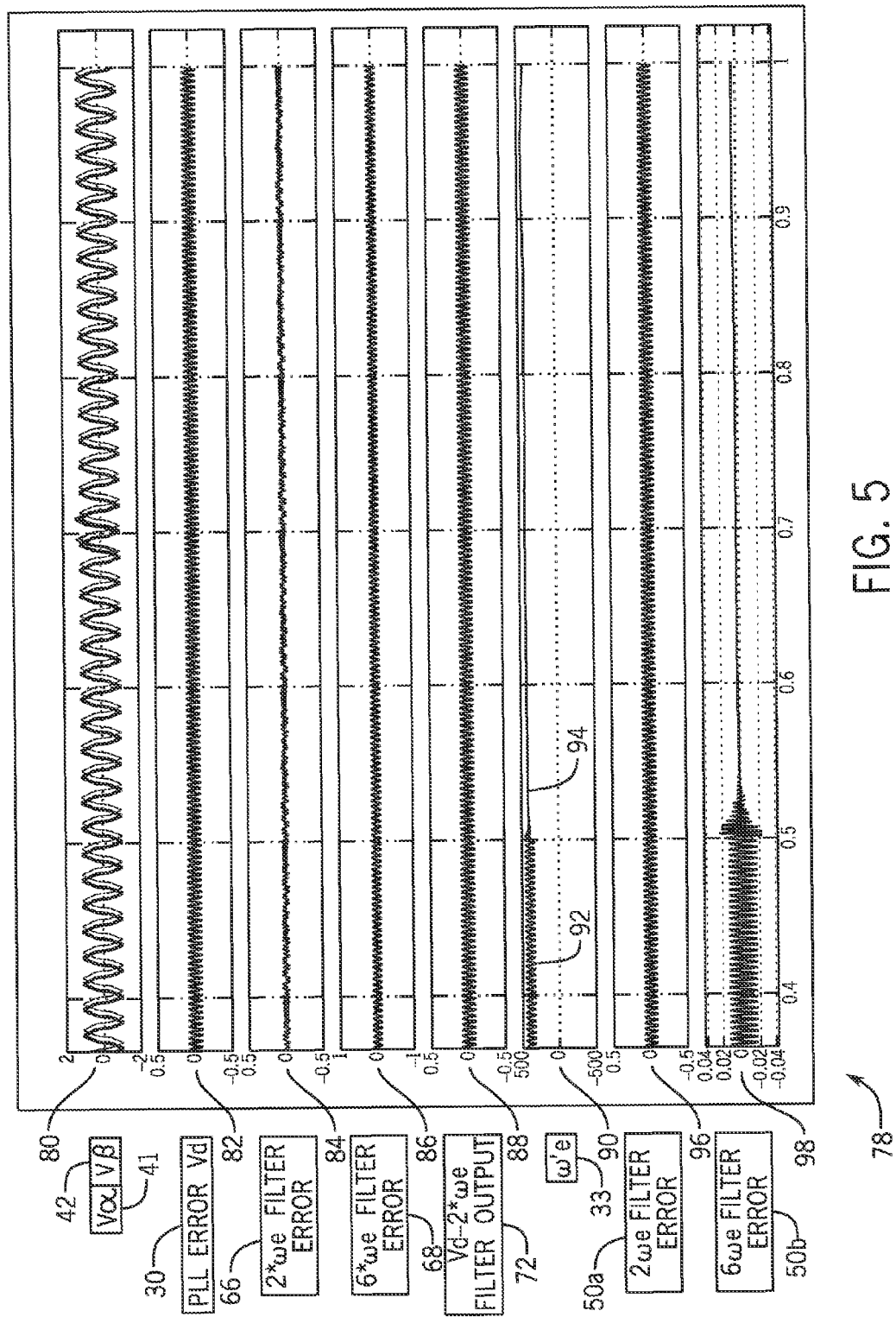
FIG. 5 is a graph depicting a series of graphs each illustrative of a different stage and/or type of signal related to the phase-locked-loop of FIG. 4.

FIG. 5 illustrates an embodiment of the effects of the PLL 60 of FIG. 4, depicting a series of graphs 78 each illustrative of a different stage and/or type of signal from the PLL 64 having the one or more cascade filters 62. For example, a first graph 80 may be representative of the unbalanced input voltages (e.g., A sin δ 41 and B cos δ 42) provided to the PLL 64. The unbalanced inputs may be unbalanced in phase and/or amplitude, as illustrated with the different voltage vectors having different voltage amplitudes A and B. The two inputs A sin δ 41 and B cos δ 42 may be transformed to obtain $V_d$ 30. The signal $V_d$ 30 may be representative of an estimate of the imbalance in the voltage vectors of the grid 10 and the PLL error, and may be depicted as the second graph 82.

In certain embodiments, the PLL 64 may include one or more cascade tracking filters 62 that may be configured to determine the disturbances 50 in the $V_d$ 30, where each disturbance 50 may be a high order harmonic (e.g., $1^{st}$, $2^{nd}$, $3^{rd}$, $4^{th}$, $5^{th}$, $6^{th}$, $7^{th}$, or $n^{th}$ harmonic disturbances) and/or voltage measurement offset, imbalance and distortion. For example, a third graph 84 may be representative of the first tracking filter 66, and a fourth graph 86 may be representative of the second tracking filter 68. In certain embodiments, the cascade tracking filters 62 may be configured to determine and/or track the disturbances 50, which may be removed the signal $V_d$ 30 to produce a clean voltage signal 54. The clean voltage signal 54 may be provided to the compensator 32 of the PLL 64, which may be configured to determine and output the frequency estimate ω'e 33 of the grid voltage. For example, the first tracking filter 66 may be configured to determine a disturbance 50a representative of twice the fundamental frequency of the error signal $V_d$ 30 (e.g., third harmonic component). Accordingly, the adder/subtractor 52 may be configured to remove the third harmonic component (e.g., the disturbance 50a) from the signal $V_d$ 30 to generate the signal $V_d$ 72, as depicted in a fifth graph 88.

In some embodiments, additional tracking filters 62 may be utilized and/or needed to remove the disturbances 50 from the signal $V_d$ 30, and the tracking filters 62 may be particularly configured to determine a particular disturbance 50 (e.g., $2^{nd}$, $3^{rd}$, $4^{th}$, $5^{th}$, $6^{th}$, $7^{th}$, or $n^{th}$ harmonic disturbances) and/or voltage imbalance. For example, in a sixth graph 90, a first portion 92 of the frequency estimate ω'e 33 of the grid voltage illustrates a frequency estimate ω'e 33 generated from the signal $V_d$ 30, which may still include a harmonic disturbance component. However, a second portion 94 of the frequency estimate ω'e 33 illustrates a frequency estimate ω'e 33 determined from a clean voltage 54, such as the clean voltage 54 generated after removing disturbances 50 via the second tracking filter 68. For example, the second portion 94 of the frequency estimate ω'e 33 may correspond to the period of time when the second tracking filter 68 is activated and/or utilized, as illustrated when the sixth graph 90 and a eighth graph 98 (e.g., the output 50b generated from the second tracking filer 68) are compared. It should be noted that the frequency estimate ω'e 33 illustrated in sixth graph 90 is not affected by the first tracking filter 66 (e.g., the output 50a generated from the first tracking filter 66), as illustrated in a seventh graph 96.

Accordingly, the illustrated embodiments provide techniques for the arrangement of tracking filters within a PLL 22 which may be configured to maintain synchronization with the grid 10 even when imbalanced voltage are present (e.g., A sin δ 41 and B cos δ 42). In certain embodiments, the tracking filters may be arranged in the parallel configuration 47. In some embodiments, such as within the illustrated embodiment, the tracking filters 62 may be arranged in a cascading configuration, otherwise known as a "series arrangement" 63. The dynamic responses of the PLL 22 may determine whether the parallel configuration or a cascading configuration of tracking filters is more preferable.

For example, in some situations, the cascading tracking filters 62 may be more preferable because they are configured to function independent of other cascading filters 62 when determining and/or tracking the various orders of disturbances 50 (e.g., (e.g., $1^{st}$, $2^{nd}$, $3^{rd}$, $4^{th}$, $5^{th}$, $6^{th}$, $7^{th}$, or $n^{th}$ harmonic disturbances and/or voltage imbalances). Further, the cascading tracking filters 62 may have more preferable transient/steady state performance when compared to the tracking filters arranged in the parallel configuration. For tracking filters in parallel configuration, for a particular parallel tracking filter, the locations and the frequencies of the system zeros associated with the parallel tracking filter are a function of various parameters, such as a center frequency, a bandwidth of the parallel tracking filter, and the bandwidth of other parallel tracking filters in the system. For tracking filters arranged in cascading configurations, for a particular cascading tracking filter, the locations and the frequencies of the system zeros associated with this tracking filter are only a function of the center frequency of the cascading tracking filter. Accordingly, tracking filters arranged in a cascading configuration and/or tracking filters arranged in both cascade and parallel configurations may provide additional benefits when compared to utilizing only parallel tracking filters. As will be appreciated by those skilled in the art, in some control systems contexts, the system zero of a transfer function is the frequency at which the nominator of this function is equal to zero, which consequently means the output of the system will be zero at this particular frequency.

For example, to further illustrate the discussion above, a cascading tracking filter and a parallel tracking filter may both be set to the same bandwidth value. Further, the center frequency of both types of tracking filters may be tuned to double the line frequency (e.g., 120 Hz) and six times the line frequency (e.g., 360 Hz). In this example, the frequencies of the system zeros of the cascading tracking filter remain fixed at 120 Hz and 360 Hz regardless of the value of the bandwidth "a". Accordingly, the cascading tracking filter in this example may be configured to completely eliminating the harmonic at these particular frequencies. Further, in this example, the frequencies of the system zeros of the parallel tracking filter may be drift from their preset values of 120 Hz and 360 Hz.

In particular, it should be noted that in certain embodiments, any number of tracking filters may be utilized within the PLL 22, and the tracking filters utilized may be arranged in both cascading and parallel arrangements. For example, while the illustrated embodiments depict either a parallel arrangement of tracking filters or a cascading arrangement of tracking filters, it should be noted that in certain embodiments, the PLL 22 may include both types of tracking filters within a particular embodiment. Indeed, the arrangement of the parallel and cascading tracking filters may be in any combination. For example, one or more parallel tracking filters may be followed by one or more cascading tracking filters, one or more parallel tracking filters may be interspersed between one or more cascading tracking filters, a series of parallel tracking filters may be interspersed with one or more cascading tracking filter, and so forth.

Mitigating the effects of voltage imbalance may enable the grid 10 to operate synchronously, and may also protect devices powered by the grid 10 from the adverse affects of current imbalance. The configuration of embodiments of the present techniques of tracking and/or removing disturbances via one or more tracking filters are not limited to the configuration illustrated in FIGS. 2-4. For example, the compensator 32 may output an estimated phase angle δ'' to devices external to the PLL 22, or the estimated phase angle δ'' may be further processed and/or filtered before it is returned to the grid 10. Further, an integrator may be separate from or coupled to the compensator 32.

While only certain features of the invention have been illustrated and described herein, many modification and changes will occur to those skilled in the art. It is, therefore, to be understood that the appended claims are intended to cover all such modifications and changes as fall within the true spirit of the invention.

The invention claimed is:

1. A method for synchronizing an electric power source, comprising:
   receiving a phase voltage of an electric power source;
   determining one or more disturbance frequencies in the phase voltage via a plurality of sequential tracking filters, wherein each of the plurality of tracking filters corresponds to a harmonic of the received phase voltage;
   removing each disturbance frequency sequentially within a phase-locked loop (PLL) to produce a clean frequency; and
   performing a PLL operation on the clean frequency to determine a phase angle of the frequency.

2. The method of claim 1, comprising outputting the frequency to the electric power source, wherein the phase angle is synchronized with a phase angle of the phase voltage of the electric power source.

3. The method of claim 1, wherein the phase voltage comprises a three-phase alternating current source.

4. The method of claim 1, wherein the plurality of sequential tracking filters comprises one or more of a tracking filter configured to determine or track a harmonic disturbance, a tracking filter configured to remove a direct current (DC) component of the phase voltage, and a tracking filter configured to remove a voltage imbalance.

5. The method of claim 4, wherein the harmonic disturbance comprises a second order disturbance representative of twice a fundamental frequency of the phase voltage or a sixth order disturbance representative of six times the fundamental frequency of the phase voltage.

6. The method of claim 5, wherein the second order disturbance corresponds to an imbalance in the phase voltage.

7. The method of claim 5, wherein the sixth order disturbance corresponds to a fifth harmonic disturbance or a seventh harmonic disturbance in the phase voltage.

8. The method of claim 1, wherein the one or more disturbance frequencies comprises one or more of a harmonic disturbance, a voltage imbalance, and a DC component of the phase voltage.

9. The method of claim 1, wherein performing the PLL operation comprises receiving a feedback to the phase angle of the phase voltage of the electric power source.

10. The method of claim 9, wherein performing the PLL operation further comprises:
    performing a transformation on the feedback and the phase voltage of the power source to generate a transformed value;
    deriving an estimated phase voltage frequency of the power source based on the transformed value;
    deriving an estimated phase angle of the estimated phase voltage frequency of the power source based on the transformed value; and
    locking on the estimated phase angle.

11. A system, comprising:
    one or more sequential tracking filters configured to determine a frequency of one or more disturbances in the phase voltage, wherein each tracking filter corresponds to a harmonic of the received phase voltage; and
    a phase-locked loop (PLL) configured to remove each determined disturbance frequency sequentially via the one or more sequential tracking filters to generate a clean frequency, and wherein the PLL is configured to determine a phase angle of an electric power source based on the clean frequency.

12. The system of claim 11, wherein the phase voltage comprises one or more imbalanced voltage components.

13. The system of claim 11, wherein the PLL is configured to operate continuously.

14. The system of claim 11, wherein the plurality of sequential tracking filters comprises one or more of a tracking filter configured to determine or track a harmonic disturbance, a tracking filter configured to remove a direct current (DC) component of the phase voltage, and a tracking filter configured to remove a voltage imbalance.

15. The system of claim 14, wherein each of the plurality of sequential tracking filters are configured to function independently of other sequential tracking filters to determine the harmonic disturbance, remove the effect of the DC component of the phase voltage, or remove the effect of the voltage imbalance.

16. The system of claim 11, wherein the electric power source is a three-phase electric power source, and wherein the electric power source voltage comprises three phases.

17. A phase-locked loop (PLL), comprising:
    circuitry configured to receive a phase voltage of an electric power source, determine an estimated phase angle based on a clean phase voltage of the electric power source, and output a voltage based on the estimated phase angle; and
    one or more sequential tracking filters configured to determine one or more harmonic disturbance frequencies in the phase voltage, wherein each sequential tracking filter is configured to sequentially remove the determined harmonic disturbance frequency component from the phase voltage to produce the clean phase voltage.

18. The PLL of claim 17, wherein the PLL is configured to receive one or more imbalanced voltages of the electric power source.

19. The PLL of claim 17, wherein the one or more harmonic disturbance frequencies comprises a second order disturbance representative of twice a fundamental frequency of the phase voltage or a sixth order disturbance representative of six times the fundamental frequency of the phase voltage.

20. The PLL of claim 19, wherein each of the plurality of sequential tracking filters are configured to function independently of other sequential tracking filters to determine the one or more harmonic disturbance frequencies.

* * * * *